United States Patent [19]

Armbruster

[11] Patent Number: 4,785,884

[45] Date of Patent: Nov. 22, 1988

[54] CONSOLIDATION OF PARTIALLY CURED RESIN COATED PARTICULATE MATERIAL

[75] Inventor: David R. Armbruster, Forest Park, Ill.

[73] Assignee: Acme Resin Corporation, Westchester, Ill.

[21] Appl. No.: 149,569

[22] Filed: Jan. 28, 1988

Related U.S. Application Data

[63] Continuation-in-part of Ser. No. 866,440, May 23, 1986, abandoned.

[51] Int. Cl.$^4$ .................... E21B 43/04; E21B 43/267
[52] U.S. Cl. ............................. 166/280; 166/276; 166/295
[58] Field of Search ............ 166/280, 295, 276; 523/131, 130; 528/139, 127; 428/407

[56] References Cited

U.S. PATENT DOCUMENTS

| | | | |
|---|---|---|---|
| 3,393,736 | 7/1968 | Goodwin | 166/276 |
| 3,404,735 | 8/1968 | Young et al. | 166/295 |
| 3,419,073 | 12/1968 | Brooks | 166/295 |
| 3,625,287 | 12/1971 | Young | 166/295 |
| 4,021,401 | 5/1977 | Jeppsen | 523/131 |
| 4,073,343 | 2/1978 | Harnsberger | 166/295 |
| 4,336,842 | 6/1982 | Graham et al. | 166/276 |
| 4,403,076 | 9/1983 | McDonald | 427/221 |
| 4,413,931 | 11/1983 | McDonald | 166/295 |
| 4,439,489 | 3/1984 | Johnson et al. | 428/407 |
| 4,443,347 | 4/1984 | Underdown et al. | 166/280 |
| 4,487,868 | 12/1984 | Armbruster | 524/44 |
| 4,518,039 | 5/1985 | Graham et al. | 166/295 X |
| 4,564,459 | 1/1986 | Underdown | 428/407 |
| 4,669,543 | 6/1987 | Young | 166/295 X |

Primary Examiner—Stephen J. Novosad

[57] ABSTRACT

A proppant composed of particulate material coated with a solid thermosetting resin that can consolidate and cure at tempertures below about 130° F. An acidic catalyst in a solvent system is used to cure the resin underground.

10 Claims, No Drawings

CONSOLIDATION OF PARTIALLY CURED RESIN COATED PARTICULATE MATERIAL

This is a continuation-in-part of application Ser. No. 866,440, filed May 23, 1986, now abandoned.

BACKGROUND OF THE INVENTION

The present invention relates to a process for preparing particulate matter coated with a solid curable resin and utilizing the coated particulate material as a proppant or for sand control by consolidating and curing the coated particulate material underground.

Hydraulic fracturing is a technique for stimulating the production of subterranean formations. The technique normally involves (1) injecting a viscous liquid through a well and into a formation at a sufficient rate and pressure to overcome the earth stresses and form a crack or fracture in the formation; and (2) placing a particulate material, referred to as a "propping agent" or "proppant" in the formation to maintain the fracture in a propped condition when the injection pressure is released.

The propped fracture thus provides a highly conductive channel in the formation. The degree of stimulation afforded by the hydraulic fracture treatment is largely dependent upon the permeability and width of the propped fracture.

In hydraulic fracturing applications where proppants are used, proppant flow back can be a problem when the well is put into operation. Some of the proppant can be transported out of the fractured zones and into the well stem by fluids produced from the well.

This backflow is undesirable and has been controlled to an extent in some instances by the use of a proppant that has been coated with a solid curable resin which will consolidate and cure underground. Phenolic resin coated proppants have been commercially available for some time and are used for this purpose.

These curable phenolic resin coated proppants work best in environments where temperatures are sufficiently high to consolidate and cure the phenolic resins. However, at underground temperatures below about 130° F., these curable phenolic resin coated proppants are not useful because they do not consolidate and cure adequately to obtain sufficient compressive strength to prevent flowback.

Many shallow wells often have underground temperatures of less than about 130° F., and in some cases of less than about 100° F. At the present time there are no commercially available curable free-flowing resin coated proppants which satisfactorily cure at these temperatures.

Curable free-flowing phenolic resin coated particulate material can also be used for sand control. Wells that are placed in formations that contain poorly consolidated sand can produce sand along with the fluid. This is undesirable for a number of reasons. This sand production can be controlled by placing curable phenolic resin coated particulate material around the well stem, then curing it to form a consolidated sand filter to prevent loose formation sand or other debris from flowing into the well stem. As in fracturing the problem is that the phenolic resin coated sands do not operate satisfactorily at about below 130° F.

An attempt to deal with this sand control problem has been with the use of liquid curable resins. In this approach, particles, usually coarse sand, are placed around the well bore and a liquid resin such as an epoxy or furan resin is pumped through the sand in an effort to coat the liquid resin onto the sand. This is followed by contacting the liquid resin coated proppant with an overflush fluid containing a suitable catalyst, which is pumped into the proppant and retained there until the resin cures and consolidates the proppant.

In many cases it would be preferable to use a proppant with a solid curable resin coating which could consolidate and cure at temperatures in the range of 60° to about 130° F., rather than a liquid resin. The disadvantages of using liquid resins in these conditions is that it is difficult to control the amount of resin that coats the proppant. If too little resin is used, flowback could occur. If too much resin is used, the permeability could be too low. In addition, the liquid resin could enter the formation and seal it off. There is no way to assure that the liquid resin completely and uniformly coats and bonds the sand around the well bore.

The patent literature dealing with this technology includes U.S. Pat. No. 3,625,287 to Young which discloses the use of specific silane or organosilicon compounds added to a liquid resin system can be used to consolidate loose or incompetent sands to produce a stronger, stable product. The resin systems include furan resins, phenolic resins, urea formaldehyde resins, and epoxy resins.

U.S. Pat. No. 3,419,073 to Brooks discloses the use of normal hexanol or a similar aliphatic alcohol containing from 5 to 10 carbon atoms, injected into an unconsolidated formation. The well is then shut for about one-half to about 120 hours, and a resin solution or mixture of resinous materials is thereafter injected, resulting in improved strength and reduction of permeability losses. Resins useful in this process include epoxy resins, furfuryl alcohol resins and urea formaldehyde resins.

U.S. Pat. No. 3,404,735 to Young et al discloses a method for consolidating loose solids introduced into a well by dispersing a predetermined amount of resin or consolidating fluid in an oil base liquid hydrocarbon. Subsequently, a quantity of particulate material is introduced into the resin-oil dispersion thereby coating the solids with resin. The oil-resin-solids mixture is then introduced through a well bore to a fracturing formation, with injection continuing until a sand out or pack out occurs and the desired amount of resin coated solids is deposited in the well bore. Excess solids are removed by reverse circulation.

U.S. Pat. No. 4,073,343 to Harnsberger discloses a method for treating an incompetent sand containing underground formation by introducing specific amounts of furfuryl alcohol, surfactant, water, silane coupling agent, catalyst and aromatic distillate in the formation sand to be consolidated.

U.S. Pat. No. 3,393,736 to Goodwin discloses a method for controlling movement of sand in a well by pumping particulate matter coated with a resin-forming liquid or semi-liquid material, into the well. The liquid or semi-liquid resinous material also contains a catalyst which is capable of curing the resin. Suitable resins include furfuryl alcohol resins, urea formaldehyde resins, epoxy resins, phenol-formaldehyde resins and alkyd resins.

U.S. Pat. No. 4,443,347 to Underdown et al discloses a method for propping a fracture in a subterranean well formation which comprises injecting a proppant composed of individual substrate particles having a thermoset coating. The coating produces a charge wherein the conductivity ratio throughout a given closure stress range is greater than that of a charge of uncoated particles having substantially the same particle size distribution.

U.S. Pat. No. 4,413,931 to McDonald discloses the treatment of subterranean geological formations such as those surrounding oil well bore holes by placing particulate material in or adjacent to the formation. The particulate material is coated with a two-step, curable, novolac-type phenolic resin, which is thereafter cured in situ to bond the particulate matter together. In order to achieve the desired compressive strength, the resin must have an insolubility parameter of greater than about 1. This type of resin is not useful below about 130° F.

U.S. Pat. No. 4,336,842 to Graham et al, discloses curing a packed resole resin coated sand in a solution of a resin softening agent comprising alcohols such as isopropanol, methanol or ethanol and nonionic surfactants. It has been found that this resin system becomes tacky, but does not satisfactorily cure at low temperatures.

SUMMARY OF THE INVENTION

The present invention relates to a process for propping a fracture or controlling sand in a subterranean formation. A particulate material coated with a thermosetting resin capable of curing with an acidic catalyst below about 130° F. is placed in the fracture and the thermosetting resin is then cured by contacting it with an acidic catalyst dissolved in a solvent system capable of softening the resin.

DESCRIPTION OF THE PREFERRED EMBODIMENTS

In accordance with the present invention, a proppant material coated with a solid curable coating of a furan-phenolic resin or phenolic resin is consolidated with an acidic catalyst dissolved in a solvent system. The solvent system is capable of softening the solid resin to the point where the resin can form bonds between and consolidate the individual proppant particles. The acidic catalyst dissolved in the solvent system is capable of curing the resin in about 24 hours or less.

The proppant material can be any of the solid particulate materials normally used as propping agents. Such materials include sand, sintered bauxite, zircon ceramic materials and glass beads. The proppant materials should be resistant to melting at temperatures below about 450° F. The proppant particles are preferably of a relatively uniform size. Particle sizes commonly employed vary from about 10 and 100 mesh, U.S. Standard Screen size. Sands which conform with the American Petroleum Institute specifications for fracturing and/or sand control sands are particularly preferred as proppant materials.

The phenolic resins used in the practice of this invention are thermosetting resins made from phenol or substituted phenols and formaldehyde or other aldehydes. The preferred substituted phenols are where either the two ortho, one ortho and the para, or the two ortho and the para positions are unsubstituted. In general, the phenols that can be used are those which are suitable for making phenolic resins. Phenol and formaldehyde are preferred materials. Many of the phenolic resins suitable for use are called "resoles" and can be either in a liquid or solid state.

A "resole" is the resin product of the partial condensation of a phenol with an aldehyde in such proportions that the partial condensate is capable of further condensation to an infusible or thermoset condition.

A "novolac" is the resin product of the substantially complete condensation of a phenol with an aldehyde in such proportions that condensation is not capable of proceeding to form an infusible product. The present invention also contemplates the use of resole/novolac resin combinations that are capable of further condensation to an infusible or thermoset condition.

The furan resins used in the practice of this invention are thermosetting resins made by reacting furfuryl alcohol with an aldehyde such as formaldehyde, or by the self-polymerization of furfuryl alcohol, or a combination of reacting furfuryl alcohol with formaldehyde and self-polymerization.

Furfural can also be used in place of furfuryl alcohol. A terpolymer of phenol, furfuryl alcohol and formaldehyde can also be used in place of phenolic and furan resins.

The preferred curable resin used to coat the proppant material is a curable furfuryl alcohol-phenolformaldehyde resin, especially that disclosed in copending U.S. patent application Ser. No. 866,439, filed May 23, 1986, now U.S. Pat. No. 4,722,991, entitled "Phenol-Formaldehyde-Furfuryl Alcohol Resins", the disclosure of which is incorporated by reference herein.

Accordingly, liquid phenol-formaldehyde-furfuryl alcohol resin is mixed with the proppant material at a temperature of about 225° to 450° F. until the resin partially cures to a state where it would solidify at room temperature. The amount of time required to accomplish this depends on the sand temperature. Higher sand temperatures could shorten the time. A "working" length of time is needed to coat the liquid resin on the sand and cure it to the point where it would be a solid at room temperature. Depending on the mixing equipment, this time can range from about 30 seconds to about 3 minutes or longer.

Water is then added to cool the mix and solidify the resin. The amount of resin can vary from about 1 to 8% by weight of the particulate material. The amount of water is determined empirically. As a general rule sufficient water is added to cool the resin-proppant mix to about 140° to 180° F. When the mix is cooled to this temperature range in the mixer, it can break down to become a free-flowing product or it may be discharged from the mixer before it is free flowing as long as subsequent handling and cooling operations produce a free-flowing product. The important concern is that at ambient temperature the coated proppant be a free-flowing product composed of individual particles coated with a solid thermosetting resin.

Although it is possible to practice this invention without the use of a catalyst, it is preferred to use a curing catalyst which is sufficiently non-volatile at the operating temperatures, to accelerate the cure of the resin.

The curing catalyst can be incorporated into or premixed with the resin or added to the mixer after the resin has been added and coated on the proppant. The preferred method is to add it to the mixer after the resin has been coated. As mixing is continued, the resin cures on the particulate matter to produce a free flowing product comprised of individual particles coated with the partially cured resin. The advantage of the catalyst is that its use can result in a lower coating temperature and/or faster processing time.

The catalyst can be used as is or dissolved in water or other suitable solvent system depending on the catalyst. A strong acid catalyst must be diluted with water to prevent localized reaction of the catalyst with the resin before the catalyst has had a chance to mix with the resin. Solid catalysts that do not melt below the mixing temperature are preferably used in aqueous solution.

Specific catalysts include acids with a pKa of about 4.0 or lower, such as phosphoric, sulfuric, nitric, benzenesulfonic, toluenesulfonic, xylenesulfonic, sulfamic, oxalic, salicylic acid, and the like; water soluble multivalent metal ion salts such as the nitrates or chlorides of metals including Zn, Pb, Ca, Cu, Sn, Al, Fe, Mn, Mg, Cd and Co; and ammonia or amine salts of acids with a pKa of about 4.0 or lower, wherein the salts include the nitrates, chlorides, sulfates, fluorides, and the like.

The preferred class of catalyst is the ammonia salts of acids and the preferred catalyst is aqueous ammonium nitrate.

The amount of catalyst used can vary widely depending on the type of catalyst used, type of resin used, mixing temperature and type of mixer. In general, the amount of catalyst solids can range from about 0.2% to 10% based on the weight of the resin.

It is also desirable to include a silane additive to ensure good bonding between the resin and the particulate matter. The use of organofunctional silanes as coupling agents to improve interfacial organic-inorganic adhesion is especially preferred. These organofunctional silanes are characterized by the following formula:

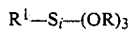

$$R^1-S_i-(OR)_3$$

where $R^1$ represents a reactive organic function and OR represents a readily labile alkoxy group such as $OCH_3$ or $OC_2H_5$. Particularly useful for coupling phenolic or furan resins to silica are the amino functional silanes of which Union Carbide A1100 (gamma aminopropyltriethoxy silane) is an example. The silane can be premixed with the resin or added to the mixer.

It is desirable to add a lubricant to the sand mix after the cooling water has been added and before the mix breaks up into free-flowing particles. The lubricant is preferably one that is liquid at the mixing temperature and has a sufficiently high boiling point so that it is not lost during the mixing process. Suitable lubricants include liquid silicone such as Dow Corning Silicone 200, mineral oil, paraffin wax, petrolatum, and the like. The amount of lubricant can vary from about 0.03% to about 0.5% by weight based upon the weight of the proppant material.

In preparing the proppant material coated with the curable phenol-formaldehyde-furfuryl alcohol resin, the particulate material can be preliminarily coated with a cured resin that includes furan-phenolic resins, furan resins, phenolic resins or other types of resins such as epoxy resins. This can be desirable in situations where the proppant can benefit from the extra strength that results from this cured coating. The resin in the cured coating can vary from about 1 to 8% by weight of the proppant. The resin in the curable coating can vary from about 1 to 8% by weight of the proppant.

The proppant material coated with the curable phenol-formaldehyde-furfuryl alcohol resin can now be used as a proppant in a well fracture zone or for sand control. It can be suitably dispensed therein and overflushed with a solvent system such as an acetone-water solution, which contains the acidic catalyst used to complete the cure of the curable resin, dissolved therein.

Any solvent system that is capable of softening the resin to the extent that the resin will become tacky and form bonds between the proppant particles and that is also capable of dissolving the acid used as the curing agent, is suitable. The solvents used in this system include alcohols such as methanol, ethanol, propanol, phenol, and the like; ketones such as acetone, methyl ethyl ketone, and the like; esters such as dimethyl adipate, dimethyl succinate, amyl acetate, butyl acetate, glycol ether acetates and the like, and other equivalent solvents such as the glycol ethers, diacetone alcohol, tetrahydrofuran, dimethylformamide, and the like.

The solvent systems generally contain a solvent, water and an acid. However, it is not necessary that water be present in all solvent systems nor is it necessary that a solvent be present if the acid catalyst can also function as the solvent. In this case, water may or may not be present. The acid could comprise about 5 to 100% by weight of the consolidating and curing system fluid. The amount of catalyst is not based directly on the amount of resin since the acid catalyst is used in an overflush. For example, a 3% resin coating or a 4% coating could use the same overflush fluid.

Suitable acid catalysts include sulfuric acid, benzene sulfonic acid, methane sulfonic acid, trichloroacetic acid, hydrochloric acid, hydrofluoric acid, ferric chloride, toluene sulfonic acid, chlorobenzene sulfonic, nitric acid, perchloric acid, and other equivalent acids. The preferred systems are acetone, sulfuric acid and water, or acetone, methanol, sulfuric acid and water.

The examples which follow serve to illustrate the present invention, and all parts and percentages are by weight unless otherwise indicated, and all screen mesh sizes are U.S. Standard Screen sizes.

EXAMPLE 1

Into a 5 liter three necked flask equipped with a stirrer, thermometer and reflux condenser were charged 1000 grams of phenol, 1150 grams of 50% formaline and 48 grams of 25% zinc acetate solution in water. The batch reached a maximum temperature of 99° C. and was reacted for 4 hours and 15 minutes. During this reaction the batch temperature gradually fell from 99° C. to 96° C. At this time the batch was cooled with cooling water and a sample checked for formaldehyde content which was 9.0% formaldehyde corresponding to 377 grams of formaldehyde being reacted with the phenol. The batch was then vacuum dehydrated at about 50° C. to remove 558 grams of distillate. 1015 grams of furfuryl alcohol was then added to the flask and the reaction continued for 5 hours and 40 minutes at about 97° C. The batch was then cooled to give a product with the following properties: Viscosity: 1,650 centipoise at 25° C.; unreacted phenol: 6.7%, unreacted furfuryl alcohol: 11.0%.

EXAMPLE 2

Into a 3 quart mixing bowl was placed 1 kilogram of 20/40 mesh silica sand. The sand was stirred with a Hobart C-100 mixer and heated with a gas flame to 383° F. 14 grams of resin from Example 1 was added and mixed for 20 seconds. 0.3 grams of A1100 silane (Union Carbide Corporation) was added. Mixing was continued and at 40 seconds of total mixing time 0.5 milliliters of a 25% water solution of ammonium nitrate added. This catalyzed the cure of the resin and by 70 seconds of mixing time the sand had "broken down" to a free flowing mix of individual sand grains coated with cured resin. At 100 seconds of mixing time 45 grams of the aforesaid Example 1 resin was added to the sand as mixing continued. At 145 seconds about 0.15 milliliters of 25% ammonium nitrate solution was added. At 180 seconds of mixing time the sand was tough dough-like mass and 45 milliliters of cooling water was added. At about 250 seconds of mixing time about 0.5 grams of L-45 silicone fluid (Union Carbide Corporation) was added to the mix. By 300 seconds the sand had "broken down" to a free flowing mix. Mixing was continued to 380 seconds and stopped. At this time the sand temperature was 155° F. and the sand removed from the bowl and allowed to cool to room temperature.

The final product consisted of individually coated particles having a thin coating of cured resin adjacent to the sand grain surface and over this cured coating was a coating of curable resin. The fact that the final coating was curable was evidenced when the sand was placed in a heated mold used to make ¼"×1" dogbone tensile strength specimens which were broken hot in the heated mold to determine the hot tensile strength of curable coated foundry sands. The coated sand fused and cured in 3 minutes at 450° F. to produce a specimen of 340 psi hot tensile strength.

EXAMPLE 3

In the same mixing equipment used in Example 1, 1 kilogram of 20/40 mesh sand was heated to 385° F. 60 grams of Example 1 resin was added and mixed for 15 seconds at which time 0.3 grams of A1100 silane was added. Mixing was continued and at 33 seconds of mixing time about 0.25 milliliters of a 50% ammonium nitrate solution was added. At 130 seconds 40 milliliters of water was added. At 165 seconds 1 gram of L-45 silicone fluid was added. At 210 seconds the mix broke down to a free flowing product. At 300 seconds mixing was stopped and the coated sand removed from the bowl. The sand temperature was 164° F. at 300 seconds mixing time and was allowed to cool to room temperature. The final mix was a free flowing product comprised of individual sand grains coated with a curable resin coating. A 3 minute, 450° F. hot tensile strength test was run as described in Example 2 and produced a specimen of 280 psi.

EXAMPLE 4

In the same mixing equipment used in Example 2, 1 kilogram of 20/40 mesh sand was heated to 385° F. 15 grams of EX5150 (Acme Resin Corp.) novolac flake resin was added and mixed for 30 seconds at which time 0.3 grams of A1100 silane was added. Mixing was continued for an additional 20 seconds and 33 grams of EX9000 (Acme Resin Corp.) resole was added to the sand. At 105 seconds of total mixing time, 30 milliliters of water was added to the mix. At 210 seconds the sand was removed from the bowl. The final product was a free flowing product comprised of individual sand grains coated with a curable phenolic resin coating.

EXAMPLE 5

In the same mixing equipment used in Example 2, 1 kilogram of 20/40 mesh sand was heated to 448° F. 60 grams of Example 1 resin was mixed with 0.3 grams of A1100 silane, added to the sand and mixed for 80 seconds. At this time 65 milliliters of water was added followed by 1 gram of L-45 silicone at 100 seconds of mixing time. At 250 seconds of mixing time the coated sand was at a temperature of 155° F. and was discharged from the bowl as a free flowing product consisting of individual sand grains coated with a curable resin coating. A 3 minute, 450° F. hot tensile strength test was run as described in Example 2 and produced a specimen of 50 psi.

CONSOLIDATION OF CURABLE COATED SANDS

The curable coated sands of Examples 2, 3, 4 and 5 were tested for their ability to bond, cure and consolidate in a consolidation fluid by the following method. A 4 inch by 1 inch inside diameter plastic test tube was filled to about ½ inch from the top with the coated sand. The consolidation fluid was added in a manner to displace all the air in the tube and wet and cover the coated sand. The tubes were stoppered and then placed in a 40° C. oven for about 24 hours to cure and consolidate the sand. The consolidated sand specimen was then removed from the tube and cut to a length of 2 inches to provide a testing specimen flat on both ends. The specimen was tested for the amount of compression strength needed to break the specimen, and the results are tabulated in Table I as follows:

TABLE I

| CONSOLIDATION OF CURABLE COATED SANDS AT 104° F. | | | | | |
|---|---|---|---|---|---|
| Coated Sand | Example II | Example II | Example II | Example II | Example III |
| Consolidation Fluid* | 3 pts-Acetone 2 pts-H$_2$SO$_4$ 5 pts-water | 3 pts-Acetone 2 pts-Benzene Sulfonic Acid (BSA) 5 pts-water | 2 pts-Phenol 3 pts-BSA 5 pts-water | 2 pts-DBE #2** 2 pts-Acetone 3 pts-BSA 3 pts-water | 4 pts-Acetone 3¼ pts-BSA 3 pts-water |
| Consolidation Time | 20 hrs. | 26 hrs. | 20 hrs. | 20 hrs. | 24 hrs. |
| Compressive Strength | 510 psi | 382 psi | 220 psi | 225 psi | 345 psi |
| Coated Sand | Example III | Example IV | Example IV | Example V | |
| Consolidation Fluid* | 3 pts-Acetone 2 pts-H$_2$SO$_4$ 5 pts-water | 4 pts-Acetone 2 pts-H$_2$SO$_4$ 4 pts-water | 2 pts-Acetone 1 pt-Methanol 2 pts-H$_2$SO$_4$ 5 pts-water | 3 pts-MEK 2 pts-35% HCl in water 1 pt-water | |
| Consolidation Time | 24 hrs. | 24 hrs. | 24 hrs. | 24 hrs. | |
| Compressive | 305 psi | 550 psi | 680 psi | 166 psi | |

TABLE I-continued

CONSOLIDATION OF CURABLE COATED SANDS AT 104° F.

Strength

*All parts by weight.
**Commercial DuPont product consisting of the dimethyl esters of succinic, glutaric and adipic acids.

What is claimed is:

1. In a method for propping a fracture or controlling sand in a subterranean formation comprising placing in said fracture particulate material coated with a solid curable resin and then curing said curable resin, wherein the improvement comprises using particulate material coated with a thermosetting resin capable of curing with an acid catalyst below about 130° F. and then curing said thermosetting resin by contacting it with an acidic catalyst dissolved in a solvent system capable of softening the resin.

2. The method of claim 1, wherein said thermosetting resin is selected from the group consisting of resoles and resole/novolac mixtures.

3. The method of claim 1, wherein said thermosetting resin is a furfuryl alcohol-phenolformaldehyde resin, or furan/phenolic mixture.

4. The method of claim 1, wherein said curable resin cures in about 24 hours or less.

5. The method of claim 1, wherein said solvent system comprises a solvent selected from the group consisting of alcohols, ketones, esters, ethers and amides.

6. The method of claim 1, wherein said solvent system comprises acetone, sulfuric acid and water.

7. The method of claim 1, wherein said solvent system comprises methyl ethyl ketone, hydrochloric acid and water.

8. The method of claim 1, wherein said solvent system also includes methanol.

9. The method of claim 1, wherein the resin cures at about 60° F. or higher.

10. The method of claim 1, wherein said acidic catalyst is selected from the group consisting of benzene sulfonic acid, sulfuric acid, methane sulfonic acid, trichloroacetic acid, hydrochloric acid, hydrofluoric acid, ferric chloride, toluene sulfonic acid, chlorobenzene sulfonic acid, nitric acid and perchloric acid.

* * * * *